United States Patent
Gune et al.

(10) Patent No.: US 12,317,198 B2
(45) Date of Patent: May 27, 2025

(54) SIDELINK TRANSMISSION RECEPTION RELIABILITY

(71) Applicant: QUALCOMM Incorporated, San Diego, CA (US)

(72) Inventors: Abhijeet Shrikrishna Gune, Frankfurt am Main (DE); Nisha Pushpavadan Champaneria, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 476 days.

(21) Appl. No.: 17/646,284

(22) Filed: Dec. 28, 2021

(65) Prior Publication Data

US 2023/0209477 A1 Jun. 29, 2023

(51) Int. Cl.
*H04W 72/25* (2023.01)
*H04W 52/28* (2009.01)
(Continued)

(52) U.S. Cl.
CPC ....... *H04W 52/285* (2013.01); *H04W 52/281* (2013.01); *H04W 52/30* (2013.01); *H04W 72/569* (2023.01)

(58) Field of Classification Search
CPC . H04W 52/285; H04W 52/281; H04W 52/30; H04W 72/569; H04W 52/0229; H04W 52/0258; H04W 52/0254; H04W 72/25; H04W 72/40; H04W 52/282; H04W 52/286; H04B 2001/0416; H04B 7/18543; H04B 7/0689
See application file for complete search history.

(56) References Cited

U.S. PATENT DOCUMENTS

| 2018/0242228 A1* | 8/2018 | Jung | H04W 76/14 |
| 2018/0249516 A1* | 8/2018 | Jung | H04W 76/11 |

(Continued)

FOREIGN PATENT DOCUMENTS

| WO | WO-2017136627 A1 * | 8/2017 |
| WO | 2019192534 A1 | 10/2019 |

(Continued)

OTHER PUBLICATIONS

Huawei, et al., "Introduction of eV2X in TS 36.331", 3GPP TSG-RAN WG2 Meeting #102, 36331_CR3423R1_(REL-15)_R2-1808917, 3rd Generation Partnership Project, Mobile Competence Centre, 650, Route Des Lucioles, F-06921 Sophia-Antipolis Cedex, vol. RAN WG2, No. Busan, Korea, 20180521-20180525, 80 Pages, Jun. 6, 2018, XP051520277, pp. 35-65.

(Continued)

*Primary Examiner* — Andrew Wendell
(74) *Attorney, Agent, or Firm* — Procopio, Cory, Hargreaves & Savitch LLP/QUALCOMM Incorporated

(57) ABSTRACT

An apparatus for wireless communications at a first UE may include a memory and at least one processor couple to the memory. The memory and the at least one processor may be configured to select one or more of a PC or a transmission scheme in response to the first UE meeting a speed state threshold. The memory and the at least one processor may (Continued)

be further configured to transmit a sidelink transmission using the one or more of the PC or the transmission scheme based on the first UE meeting the speed state threshold.

30 Claims, 8 Drawing Sheets

(51) Int. Cl.
*H04W 52/30* (2009.01)
*H04W 72/566* (2023.01)

(56) References Cited

U.S. PATENT DOCUMENTS

| | | | | |
|---|---|---|---|---|
| 2019/0261376 | A1* | 8/2019 | Li | H04W 76/14 |
| 2020/0337021 | A1* | 10/2020 | Zhang | H04L 1/08 |
| 2024/0023145 | A1* | 1/2024 | Wang | H04L 1/1848 |
| 2024/0049333 | A1* | 2/2024 | Chun | H04W 72/20 |
| 2024/0057106 | A1* | 2/2024 | Hong | H04B 7/0626 |
| 2024/0073930 | A1* | 2/2024 | Khoryaev | H04W 72/20 |
| 2024/0080708 | A1* | 3/2024 | Rao | H04W 28/0268 |
| 2024/0147283 | A1* | 5/2024 | Hu | H04W 24/10 |

FOREIGN PATENT DOCUMENTS

| | | | |
|---|---|---|---|
| WO | WO-2020222896 A1 * | 11/2020 | |
| WO | WO-2021104400 A1 * | 6/2021 | H04L 5/0051 |

OTHER PUBLICATIONS

International Search Report and Written Opinion—PCT/US2022/050776—ISA/EPO—May 22, 2023.
Partial International Search Report—PCT/US2022/050776—ISA/EPO—Mar. 27, 2023.
3GPP: "3rd Generation Partnership Project, Technical Specification Group Radio Access Network, Evolved Universal Terrestrial Radio Access (E-UTRA), Radio Resource Control (RRC), Protocol specification (Release 14)", 3GPP TS 36.331 V14.15.0, Sep. 2020, 650 Route Des Lucioles, Sophia Antipolis, Valbonne, France, pp. 1-784, section 6.3.8-SL-PSSCH-TxConfigList.
3GPP: "3rd Generation Partnership Project, Technical Specification Group Services and System Aspects, Architecture enhancements for V2X services (Release 16)", 3GPP TS 23.285 V16.4.0, Sep. 2020, 650 Route Des Lucioles, Sophia Antipolis, Valbonne, France, pp. 1-38, section 4.4.5.1.
3GPP: "3rd Generation Partnership Project, Technical Specification Group Services and System Aspects, Proximity- based services (ProSe), Stage 2 (Release 17)", 3GPP TS 23.303 V17.0.0, Dec. 2021, 650 Route Des Lucioles, Sophia Antipolis, Valbonne, France, pp. 1-131, section 5.4.6.1.

* cited by examiner

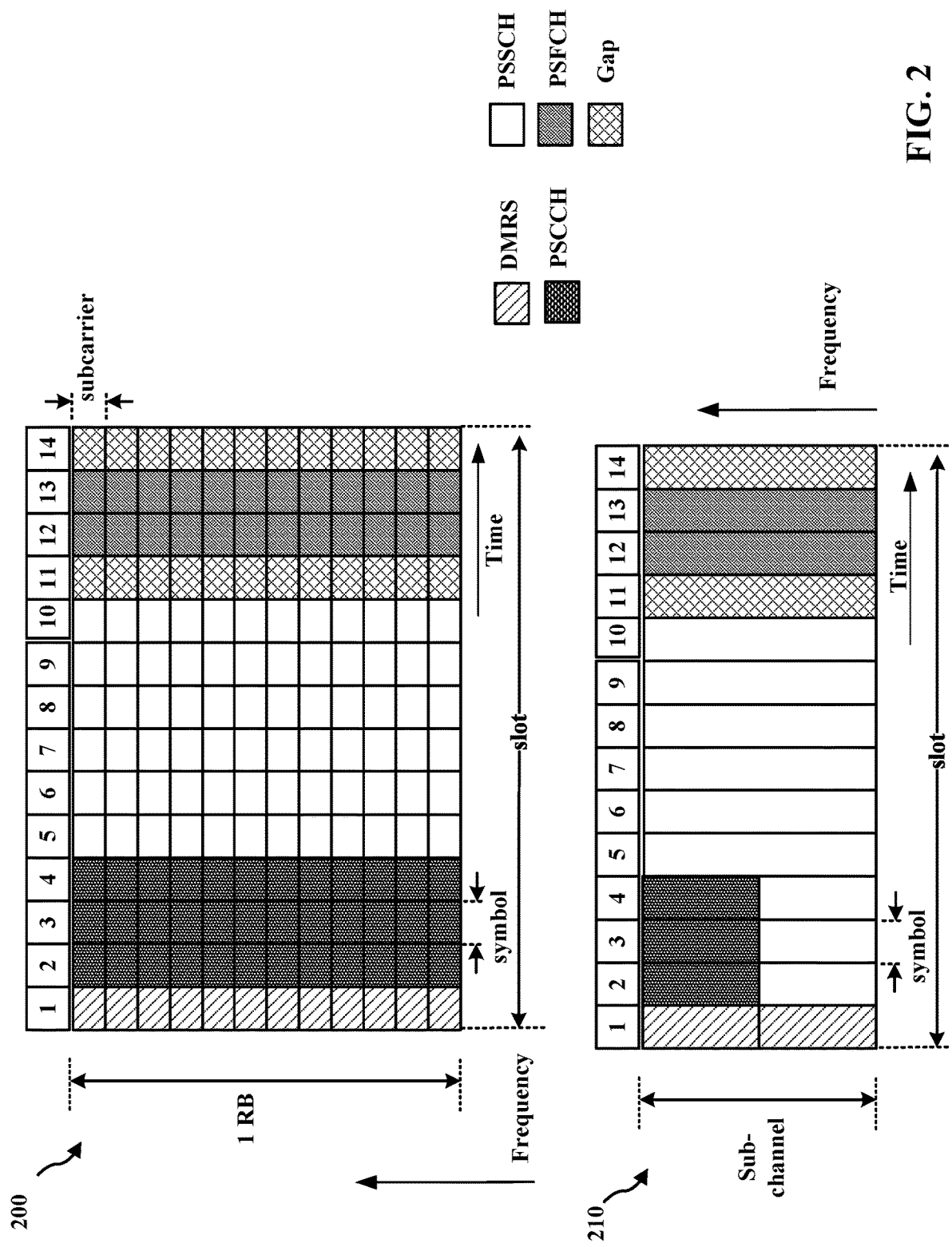

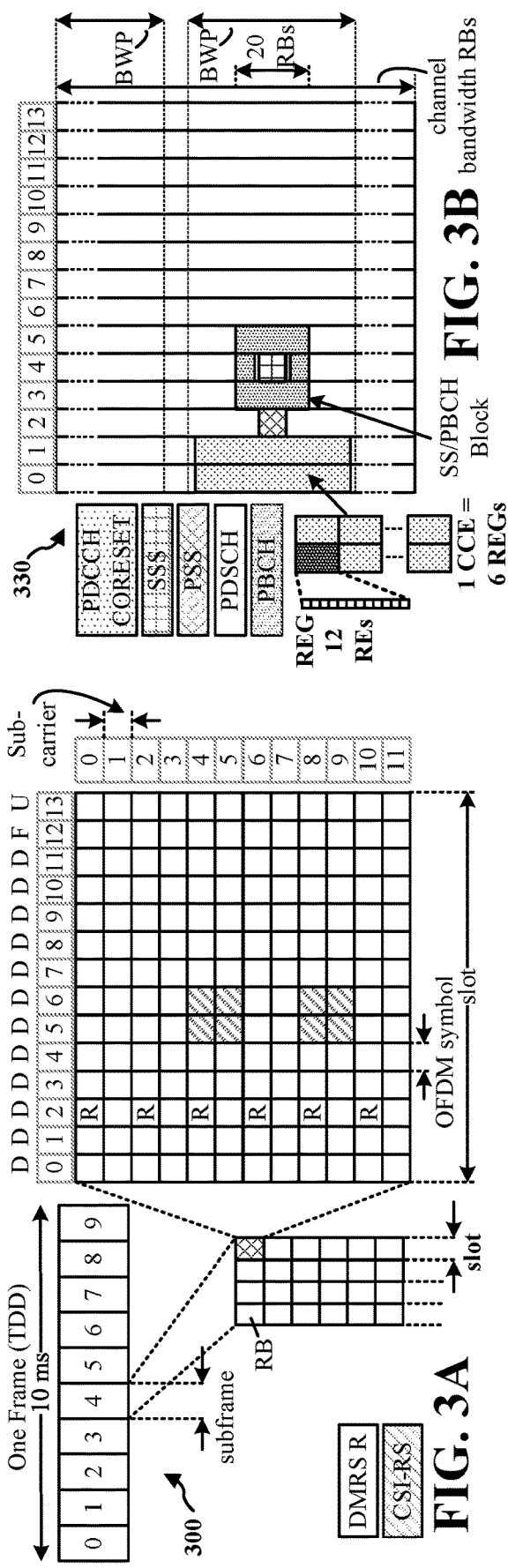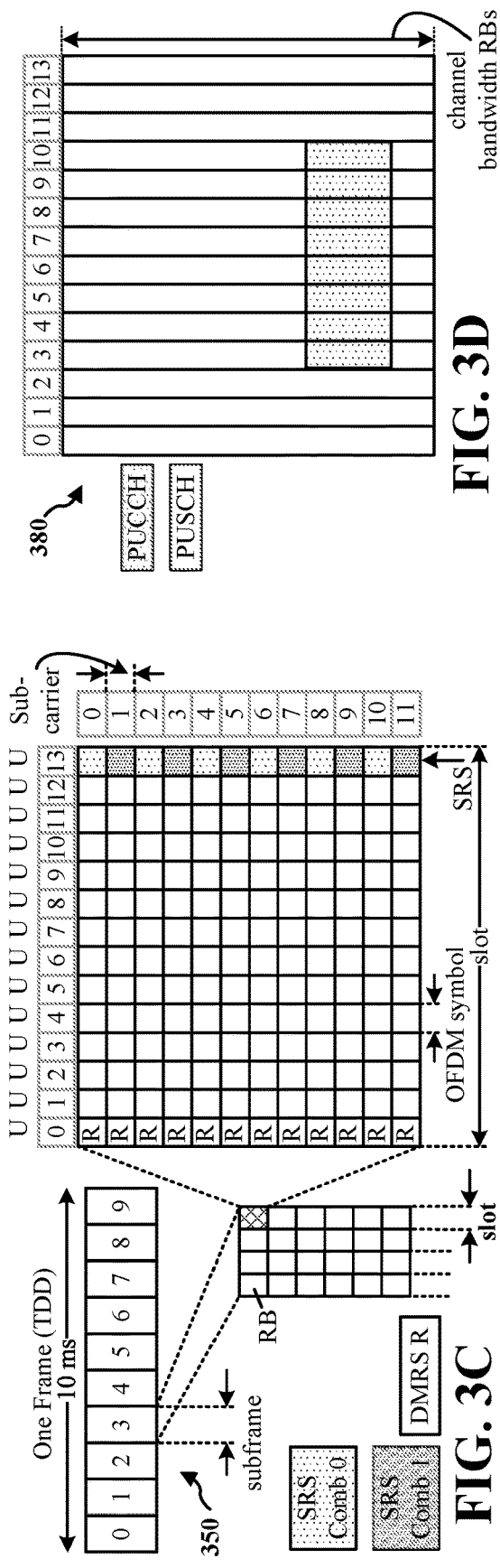

SIDELINK TRANSMISSION RECEPTION RELIABILITY

INTRODUCTION

The present disclosure relates generally to communication systems, and more particularly, to improving the reliability of sidelink transmission reception.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may include direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a first user equipment (UE) is provided. The method includes selecting one or more of a PC or a transmission scheme in response to the first UE meeting a speed state threshold. The method further includes transmitting a sidelink transmission using the one or more of the PC or the transmission scheme based on the first UE meeting the speed state threshold.

In an aspect of the disclosure an apparatus for wireless communication at a first UE is provided. The apparatus may include a memory and at least one processor coupled to the memory. The memory and the at least one processor are configured to select one or more of a PC or a transmission scheme in response to the first UE meeting a speed state threshold and to transmit a sidelink transmission using the one or more of the PC or the transmission scheme based on the first UE meeting the speed state threshold.

In an aspect of the disclosure, an apparatus for wireless communication at a first UE is provided. The apparatus includes means for selecting one or more of a PC or a transmission scheme in response to the first UE meeting a speed state threshold and means for transmitting a sidelink transmission using the one or more of the PC or the transmission scheme based on the first UE meeting the speed state threshold.

In an aspect of the disclosure, a computer-readable medium storing computer executable code for wireless communication at a first UE is provided. The code when executed by a processor causes the processor to select one or more of a PC or a transmission scheme in response to the first UE meeting a speed state threshold and transmit a sidelink transmission using the one or more of the PC or the transmission scheme based on the first UE meeting the speed state threshold.

To the accomplishment of the foregoing and related ends, the one or more aspects may include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2 illustrates example aspects of a sidelink slot structure, in accordance with various aspects of the present disclosure.

FIG. 3A is a diagram illustrating an example of a first frame, in accordance with various aspects of the present disclosure.

FIG. 3B is a diagram illustrating an example of DL channels within a subframe, in accordance with various aspects of the present disclosure.

FIG. 3C is a diagram illustrating an example of a second frame, in accordance with various aspects of the present disclosure.

FIG. 3D is a diagram illustrating an example of UL channels within a subframe, in accordance with various aspects of the present disclosure.

DETAILED DESCRIPTION

Figure 1:
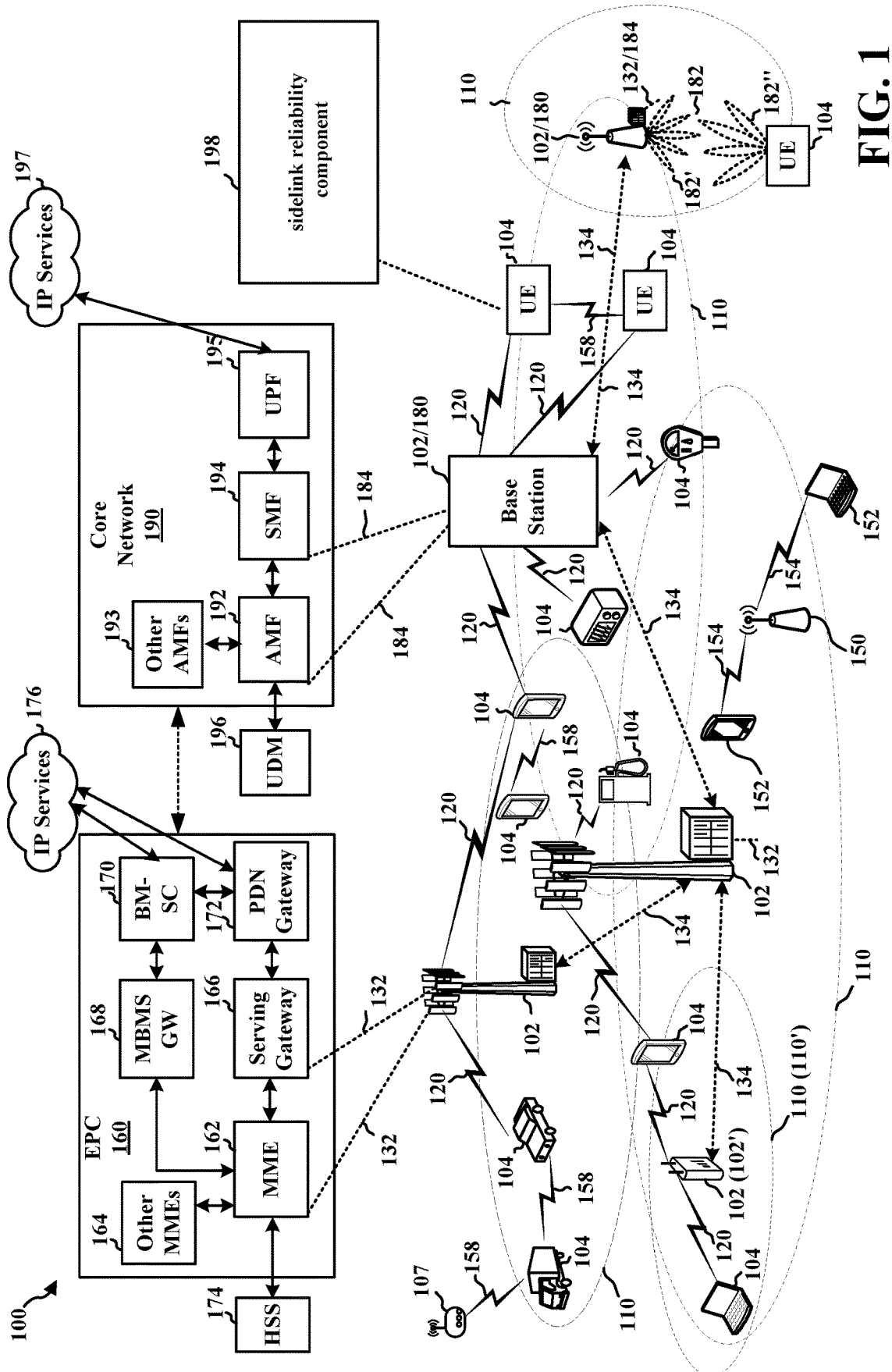
FIG. 1 is a diagram illustrating an example of a wireless communications system and an access network, in accordance with various aspects of the present disclosure.

Some wireless communication may be exchanged based on sidelink. Vehicle-to-anything (V2X) communication is an example of sidelink communication. The sidelink communication may be exchanged by a mobile device that may be capable of traveling at different speeds. As an example, a UE that travels with a vehicle may transmit sidelink communication, such as V2X messages. The reliability of a communications signal from a UE may be reduced, for example as a vehicle travels in a higher speed mobility environment. Sidelink transmissions, such as a safety critical V2X message transmitted by a UE over PC5, may have a reduced reliability at higher speeds due to a lower observed signal-to-noise (SNR) and/or a frequency shift in the signal. Aspects presented herein improve sidelink communication, such as V2X communication by adjusting a power class and/or a transmission scheme of the sidelink communication based on a speed state of the UE and/or a criticality of the message to be transmitted. For example, if the UE is in a high-speed state, the UE may change a power class for a V2X transmission to a different power class that is associated with a higher transmission power. Additionally, or alternatively, the UE may switch to a particular transmit diversity scheme, such as a transmission scheme that includes multiple antennas. In some aspects, the UE may further consider the priority level, which may be referred to as a criticality, of the message to be transmitted to further determine whether to select a particular power class and/or transmission scheme for a sidelink transmission. The change in the power class and/or transmission scheme may improve the reliability of the sidelink communication at higher speeds and may improve performance of the sidelink communication system. As well, the sidelink communication may be improved without impacting a number of channel resources used by the transmitting device. Therefore, the reliability of the sidelink communication may be improved and the performance of the sidelink communication system may be improved while maintain an efficient use of wireless channel resources.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. A V2X communication may include a basic safety message (BSM) Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a sidelink reliability component 198 configured to improve the reliability of sidelink transmissions under certain conditions, for example in response to a vehicle traveling at high speeds or in response to a sidelink transmission having a high priority.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNB s), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. In response to communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. In response to operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. The gNB 180 may be referred to as a millimeter wave base station in aspects where the gNB 180 operates in millimeter wave or near millimeter wave frequencies. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

FIG. 3A is a diagram 300 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplexed (FDD) in which for a particular set of subcarriers (carrier system bandwidth), subframes within the set of subcarriers may be dedicated for either DL or UL, or may be time division duplexed (TDD) in which for a particular set of subcarriers (carrier system bandwidth), subframes within the set of subcarriers may be dedicated for both DL and UL. In the examples provided by FIGS. 3A and 3C, the 5G NR frame structure may be assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe may be based on the CP and the numerology. The numerology defines the subcarrier spacing (SCS) and, effectively, the symbol length/duration, which is equal to 1/SCS.

| μ | SCS<br>$\Delta f = 2^\mu \cdot 15 [kHz]$ | Cyclic prefix |
|---|---|---|
| 0 | 15 | Normal |
| 1 | 30 | Normal |
| 2 | 60 | Normal, |

| μ | SCS<br>Δf = 2^μ · 15[kHz] | Cyclic prefix |
|---|---|---|
|  |  | Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 3A-3D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS may be used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
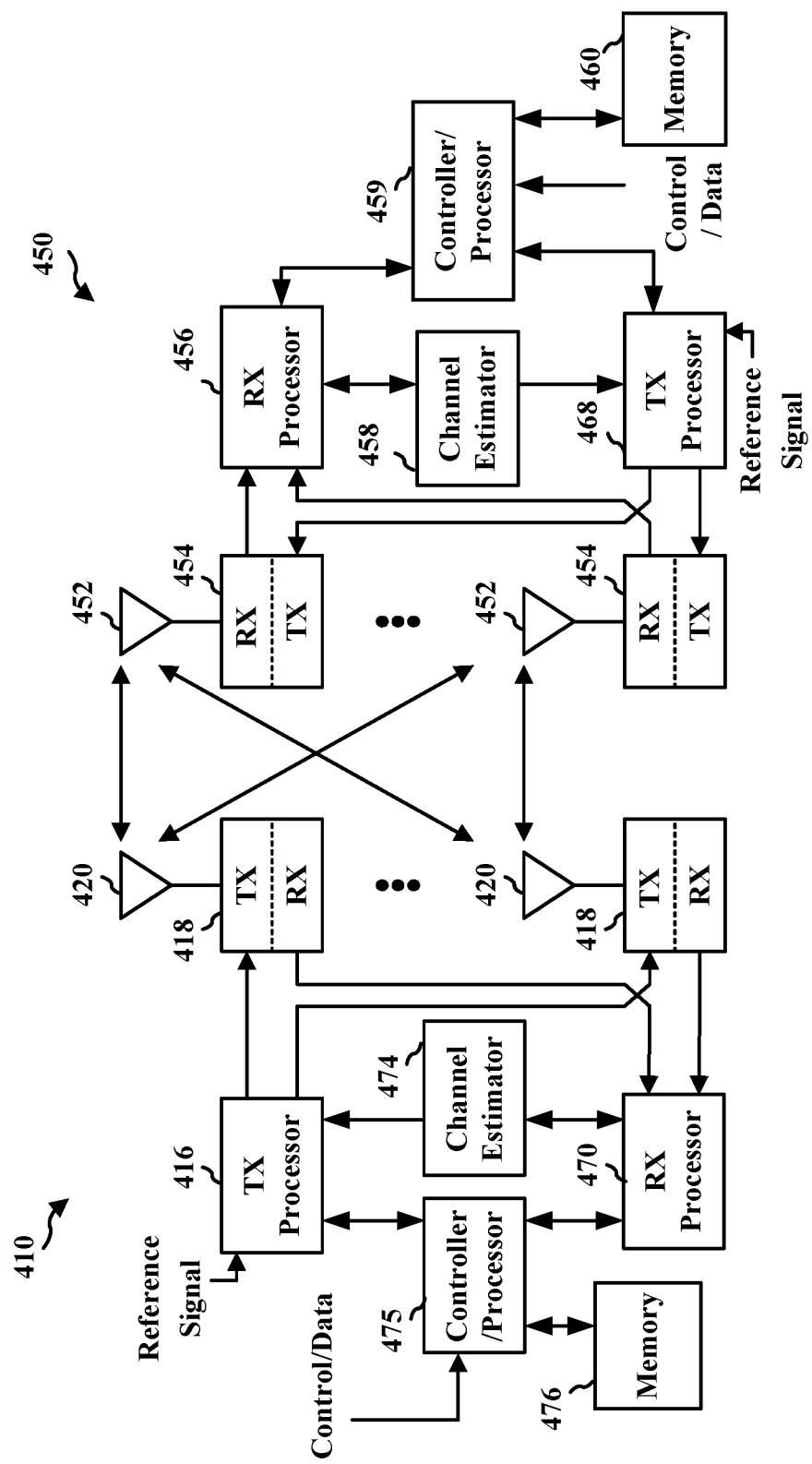
FIG. 4 is a diagram illustrating an example of a first device and a second device involved in wireless communication based, e.g., on sidelink, in accordance with various aspects of the present disclosure.

FIG. 4 is a block diagram 400 of a first wireless communication device 410 in communication with a second wireless communication device 450 based on sidelink. In some examples, the devices 410 and 450 may communicate based on V2X or other D2D communication. The communication may be based on sidelink using a PC5 interface. The devices 410 and the 450 may include a UE, an RSU, a base station, etc. Packets may be provided to a controller/processor 475 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (Tx) processor 416 and the receive (Rx) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418 Tx. Each transmitter 418 Tx may modulate an RF carrier with a respective spatial stream for transmission.

At the device 450, each receiver 454 Rx receives a signal through its respective antenna 452. Each receiver 454 Rx recovers information modulated onto an RF carrier and provides the information to the receive (Rx) processor 456. The Tx processor 468 and the Rx processor 456 implement layer 1 functionality associated with various signal processing functions. The Rx processor 456 may perform spatial processing on the information to recover any spatial streams destined for the device 450. If multiple spatial streams are destined for the device 450, they may be combined by the Rx processor 456 into a single OFDM symbol stream. The Rx processor 456 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by device 410. These soft decisions may be based on channel estimates computed by the channel estimator 458. The soft decisions are then decoded and deinterleaved to recover the data and control signals that were originally transmitted by device 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an ACK and/or NACK protocol to support HARQ operations.

Similar to the functionality described in connection with the transmission by device 410, the controller/processor 459 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the Tx processor 468 to select the appropriate coding and modulation schemes, and to facilitate spatial processing. The spatial streams generated by the Tx processor 468 may be provided to different antenna 452 via separate transmitters 454 Tx. Each transmitter 454 Tx may modulate an RF carrier with a respective spatial stream for transmission.

The transmission may be processed at the device 410 in a manner similar to that described in connection with the receiver function at the device 450. Each receiver 418 Rx may receive a signal through its respective antenna 420. Each receiver 418 Rx may recover information modulated onto an RF carrier and may provide the information to a Rx processor 470.

The controller/processor 475 may be associated with a memory 476 that stores program codes and data. The memory 476 may be referred to as a computer-readable medium. The controller/processor 475 may provide demultiplexing between transport and logical channels, packet reassembly, deciphering, header decompression, control signal processing. The controller/processor 475 may also be responsible for error detection using an ACK and/or NACK protocol to support HARQ operations.

At least one of the Tx processor 468, the Rx processor 456, and the controller/processor 459 may be configured to perform aspects in connection with 198 of FIG. 1.

At least one of the Tx processor 416, the Rx processor 470, and the controller/processor 475 may be configured to perform aspects in connection with 198 of FIG. 1.

Some wireless communication may be exchanged based on sidelink. In some aspects, a mobile device may transmit sidelink communication. The mobile device may be in motion while transmitting the sidelink communication. As one example of a wireless device that may transmit sidelink communication, a UE may be associated with a vehicle and/or may travel with or inside of a vehicle. In other examples, sidelink communication may be exchanged by non-vehicular UEs. As an example, a telematic apparatus, which may be referred to as a telematic control unit (TCU) or another user equipment (UE), may provide wireless communication including wireless communication based on V2X, among other examples of sidelink communication. As an example, in the automobile industry a TCU may include a system that may be provided at a vehicle, such as on a vehicle board, and may transmit and receive wireless communication for the vehicle to one or more services via a wireless network such as a cellular network and/or to other vehicles over sidelink, such as based on V2X. The TCU may collect information from a vehicle, e.g., telemetry data, such as position, speed, direction, engine data, or connectivity quality. The data may be collected through interfaces with various sub-systems of the vehicle. The TCU may provide connectivity within the vehicle such as via WiFi, Bluetooth, etc., and may enable voice calls or other wireless communication. Among other example components, a TCU may include a satellite navigation component, e.g., based on a GNSS signal; an interface for mobile communication (GSM, GPRS, Wi-Fi, LTE or 5G), which may provide the tracked values to a centralized geographical information system (GIS) database server; an electronic processing unit; a controller; a microprocessor or field programmable gate array (FPGA), which may process the information and may act on the interface between the GPS; a mobile communication unit; and/or memory that may store GPS information or vehicle sensor data among other types of information.

The device that exchanges sidelink communication may include one or more antennas and transceivers which may enable communication to be transmitted or received by the device. The device may further support sidelink communication, such as V2X communication. The device may communicate based on aspects of the sidelink slot structure in FIG. 2 or the frame structure described in connection with FIGS. 3A-3D.

A UE may be configured to pair with a vehicle to support V2X functionality, for example via a PC5 interface. In some aspects, when a user carrying a mobile device is within a range of a vehicle, such as inside the vehicle, the mobile device may pair with the unit of the vehicle. Such a vehicle may travel at any suitable speed. In some aspects, the vehicle, and any UE at or within the vehicle, may travel at higher speeds, for example on an AutoBahn with average speeds of 90 mph or on a freeway with speeds that may exceed 70 mph. A vehicle may have a rail intelligent transport system (ITS) that may travel at speeds that may exceed 200 mph.

The reliability of a communications signal from a moving vehicle may be reduced as the vehicle travels in a high mobility environment with variable vehicular and beam densities. A UE at a moving vehicle may be unable to reliably receive a sidelink transmission, such as a safety critical V2X message transmitted by another UE over PC5, due to a lower observed signal-to-noise (SNR), frequency spread, and/or a frequency shift in the signal. When the difference in the speed of the transmitting UE and the speed of the receiving UE exceeds a threshold value, a doppler frequency shift may lower the reliability of decoding a transmitted message. It may be advantageous to improve the transmission signal which may enhance the reliability of decoding the received signal at receiving devices, such as a vulnerable road user (VRU) receiving a sidelink transmission—particularly if a transmitting device is moving at a high-speed relative to one or more receiving devices. As non-limiting examples of sidelink transmissions, sidelink transmissions may be from a UE at a first vehicle to any of a UE at another vehicle, to a pedestrian UE, to a UE traveling with a bicycle, etc. when the first vehicle is in a high-speed state.

Figure 5:
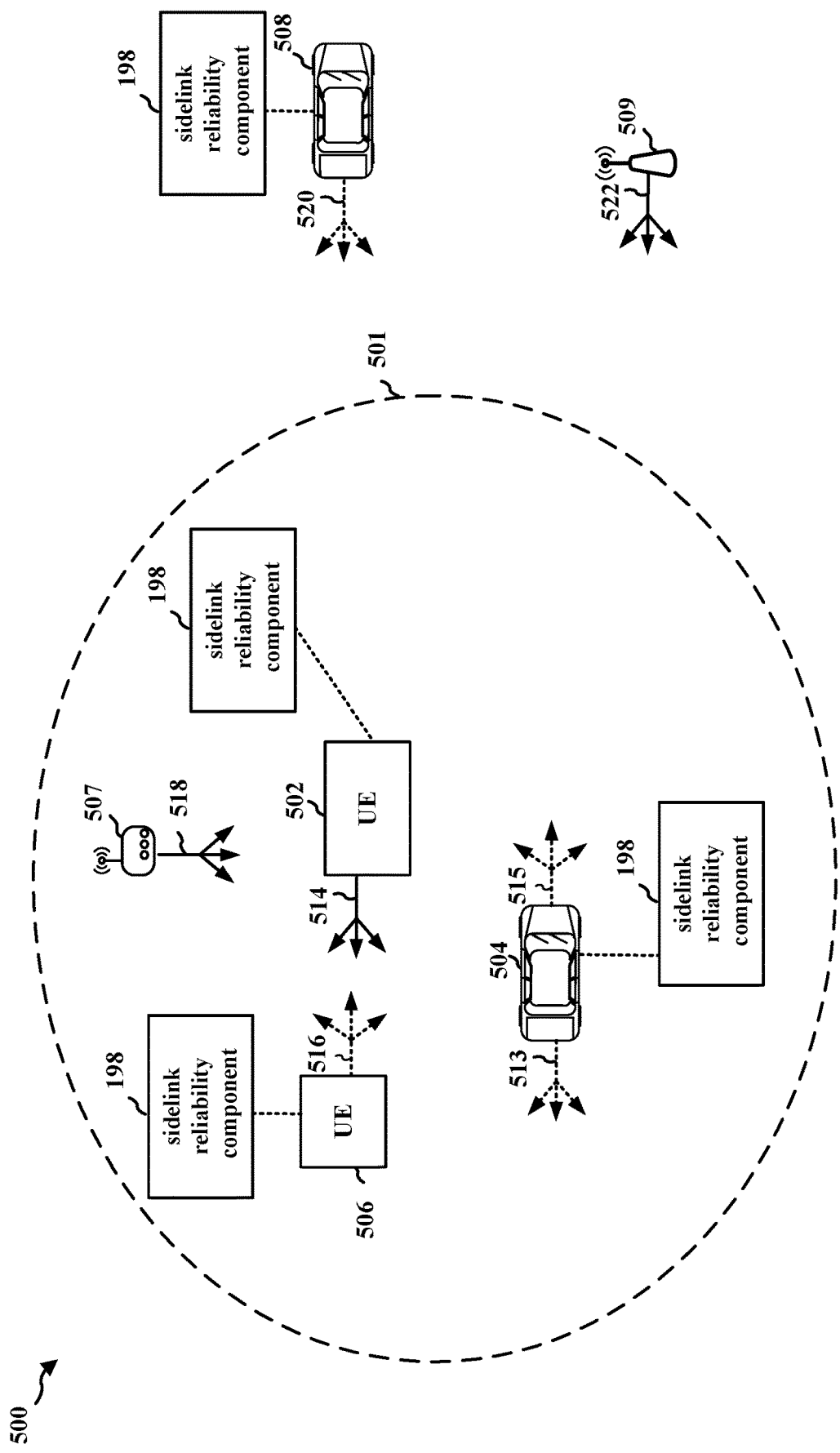
FIG. 5 illustrates example aspects of sidelink communication between devices, in accordance with aspects presented herein.

FIG. 5 illustrates an example 500 of sidelink communication between devices. The communication may be based on a slot structure including aspects described in connection with FIG. 2. For example, the UE 502 may transmit a transmission 514, e.g., including a control channel (e.g., PSCCH) and/or a corresponding data channel (e.g., PSSCH), that may be received by UEs 504, 506, 508. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that may be occupied by the data transmission. The SCI may also be used by receiving devices to avoid interference by refraining from transmitting on the reserved resources. The UEs 502, 504, 506, 508 may each be capable of sidelink transmission in addition to sidelink reception. Thus, UEs 504, 506, 508 are illustrated as transmitting transmissions 513, 515, 516, 520. The transmissions 513, 514, 515, 516, 520 may be unicast, broadcast or multicast to nearby devices. For example, UE 504 may transmit transmissions 513, 515 intended for receipt by other UEs within a range 501 of UE 504, and UE 506 may transmit transmission 516. Additionally, or alternatively, RSU 507 may receive communication from and/or transmit transmission 518 to UEs 502, 504, 506, 508. One or more of the UEs 502, 504, 506, 508 or the RSU 507 may include a sidelink reliability component 198 as described in connection with FIG. 1.

In some aspects, a UE 502, 504, 506, 508 may be configured to determine a speed state, and change one or more of a power class (PC) or a transmission scheme in response to the determined speed state. The speed state may be changed in response to the UE determining that it has met or passed a speed state threshold. Such a speed state threshold may be preconfigured or preloaded on the UE 502, 504, 506, or 508, such as by a user. Additionally, or alternatively, a network may provide such a speed state threshold in an RRC message to a UE. Such an RRC configuration message may be transmitted by the BS 509 via transmission 522, or by the RSU 507 via transmission 518. A UE 502, 504, 506, or 508 may determine a speed state in a plurality of ways. For example, the UE 502, 504, 506, or 508 may receive an RRC configuration message that defines a speed state of the UE to be based on an absolute speed of the UE as compared to a speed state threshold. The RRC configuration may define the UE as traveling at a high-speed state if the UE's absolute speed meets or exceeds the speed state threshold, and may define the UE has traveling at a low-speed state if the UE's absolute speed meets or is below the speed state threshold.

The UE 502, 504, 506, or 508 may determine a speed state based on a doppler estimate derived from one or more received signals, such as from a pilot signal or other reference signal. A doppler estimate may provide a perceived doppler effect. For example, the UE 502 may receive a pilot signal via a transmission 516 from UE 506, receive a pilot signal via a transmission 513 or 515 from UE 504, receive a pilot signal via transmission 520 from UE 508, receive a pilot signal via transmission 518 from RSU 507, and/or receive a pilot signal via transmission 522 from BS 509. The UE 502 may then estimate a doppler effect based upon a received pilot signal. Such an estimation may be used to estimate whether a transmission 514 from the UE 502 may also experience a doppler effect if received by the device that transmitted the pilot signal. If the doppler estimate (e.g., frequency shift) reaches or exceeds a threshold value, the UE 502 may determine that it is traveling in a high-speed state. Additionally, or alternatively, the UE 502, 504, 506, or 508 may determine a speed state based on a relative speed difference. For example, UE 502 may also calculate a relative speed difference between the UE 502 and another UE, such as the UE 504, 506, or 508 based on a received transmission, such as a relative speed and/or a direction of the UE. The UE 502 may calculate such a relative speed estimate using GPS information and a current vehicle speed as compared to a speed contained in one or more received messages from one or more surrounding vehicles. Additionally, or alternatively, the UE 502 may receive a relative speed difference from one of the UE 504, 506, or 508, which may be used to determine a speed state of the UE 502. The UE 504, 506, or 508 may be configured to calculate the relative speed difference based on a sidelink transmission sent from the UE 502, such as an absolute speed, direction, and/or GPS coordinates of the UE 502. The UE 502 may transmit a determination of a high-doppler state, or a high-speed state, to any of the UE 504, 506, or 508, which may be used by the UE 504, 506, or 508 to determine a high-speed state without needing to derive a doppler effect or a relative speed difference.

In some aspects, UE may determine a priority of a sidelink transmission, which may be referred to as a criticality of the sidelink transmission, based on a ProSe per-packet priority (PPPP). The UE may have a priority threshold, and may determine that a sidelink transmission has a high-priority level if the priority level of the transmission meets or exceeds the priority threshold, and/or may determine that a transmission has a low-priority level if the priority level of the transmission meets or is below the priority threshold.

The UE 502, 504, 506, or 508 may be configured to improve a sidelink transmission in response to meeting a speed state threshold, and/or in response to a sidelink transmission for transmission meeting a priority threshold, and/or in response to a battery state. Improving a transmission may result in enhancing the reliability of a receiving device to receive a sidelink transmission signal. For example, the UE 502, 504, 506, or 508 may be configured to improve reliability of a sidelink transmission if the UE determines that it is in a high-speed state, e.g., traveling at a speed that meets or exceeds a speed threshold. Additionally, or alternatively, the UE 502, 504, 506, or 508 may be configured to improve reliability of a sidelink transmission if the UE determines that a sidelink transmission to be sent has a high-priority level, e.g., having a priority level that meets or exceeds a priority threshold. Additionally, or alternatively, the UE 502, 504, 506, or 508 may be configured to improve reliability of a sidelink transmission in response to determining that the UE is in a high-speed state and a sidelink transmission to be sent has a high-priority level. Additionally, or alternatively, the UE 502, 504, 506, or 508 may be configured to not improve reliability of a sidelink transmission if the UE determines that a battery state (e.g., a battery state of a vehicle associated with the UE or a battery state of the UE) is at or below a battery threshold level. Additionally, or alternatively, the UE 502, 504, 506, or 508 may be configured to not improve reliability of a sidelink transmission in a certain way (e.g., not improve reliability by changing a PC level of the UE, but improve reliability by changing a transmission scheme of the UE) if the UE determines that a battery state is at or below a battery threshold level.

The UE 502, 504, 506, or 508 may be configured to improve reliability of a sidelink transmission in a variety of ways. For example, the UE 502, 504, 506, or 508 may change its PC level to increase a transmission power relative to the PC level the UE uses to transmit other transmissions. In one aspect, the UE 502, 504, 506, or 508 may lower its PC, such as from PC 3 to PC 2 or a similar change in PC, to improve a reliability of a sidelink transmission. Additionally, or alternatively, the UE 502, 504, 506, or 508 may change its transmission scheme to increase the reliability of a transmission relative to the transmission scheme the UE uses to transmit other transmissions. In one aspect, the UE 502, 504, 506, or 508 may switch to using a transmit switch diversity scheme (TxD) to toggle, or switch, Tx messages between two or more antennas, or to using a cyclic delay diversity scheme (CDD) to use two or more antennas to transmit the same sidelink transmission. A TxD scheme may switch between transmitting a sidelink transmission via a first antenna and a second antenna. A CDD scheme may simultaneously, e.g., at an overlapping time, transmit a sidelink transmission using both a first antenna and a second antenna. Additionally, or alternatively, the UE 502, 504, 506, or 508 may change its PC level and may change its transmission scheme to improve a reliability of a sidelink transmission.

The UE 502, 504, 506, or 508 may be configured to reset, or change to using, one or more settings to a default setting or a prior setting in response to meeting a speed state threshold, and/or in response to a sidelink transmission for transmission meeting a priority threshold. For example, the UE 502, 504, 506, or 508 may be configured to reset a PC level of the UE or reset a transmission scheme of the UE in response to the UE determining that it is in a lower-speed state, e.g., traveling below a speed threshold. Additionally, or alternatively, the UE 502, 504, 506, or 508 may be configured to reset a PC level of the UE or reset a transmission scheme of the UE in response to the UE determining that a sidelink transmission to be sent has a lower-priority level that is below a priority threshold. Additionally, or alternatively, the UE 502, 504, 506, or 508 may be configured to reset a PC level of the UE or reset a transmission scheme of the UE in response to the UE determining that it is in a lower-speed state (e.g., below a speed threshold) and a sidelink transmission to be sent has a lower-priority level (e.g., below a priority threshold). Additionally, or alternatively, the UE 502, 504, 506, or 508 may be configured to reset a PC level of the UE or reset a transmission scheme of the UE in response to the UE determining that a battery level is at or below a battery level threshold (i.e. there is insufficient power to support an increased transmission power).

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE may receive the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

By configuring a UE, such as the UE 502, 504, 506, or 508, to improve a reliability of a sidelink transmission under certain conditions, the UE may transmit sidelink transmissions with more reliability and improved performance. For example, where V2X via PC5 communication between devices occurs while any of the devices are in a high-speed state, a device in a high-speed state may select one or more of a PC or a transmission scheme to improve reliability of a sidelink transmission. Doing so does not significantly impact a number of channel resources used by the device for transmission.

Figure 6:
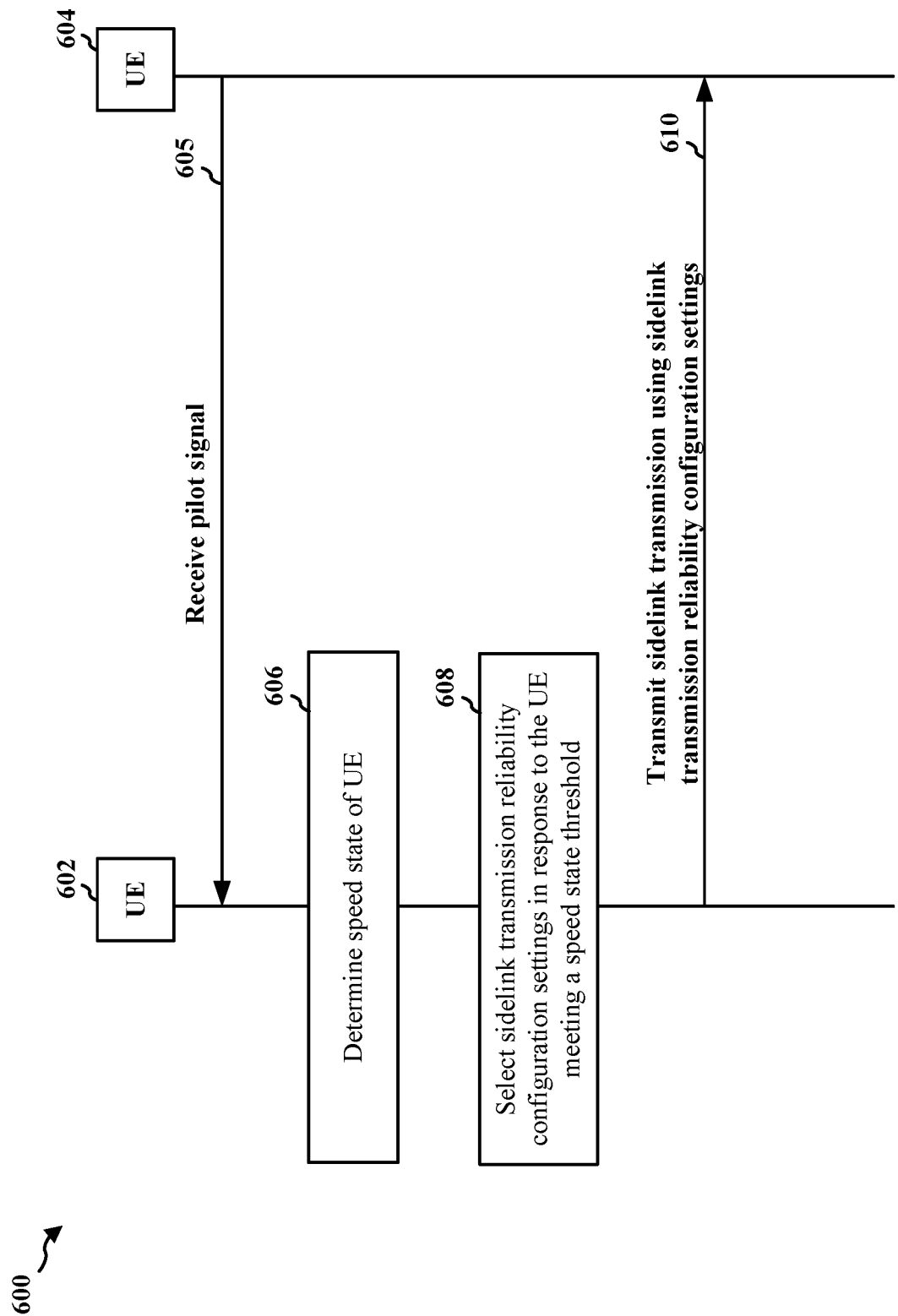
FIG. 6 is a network connection flow diagram that illustrates an example of a UE, in accordance with various aspects of the present disclosure.

FIG. 6 shows a network connection flow diagram 600 having a UE 602 configured to transmit a sidelink transmission 610 to another wireless device, such as a UE, BS, or RSU 604. The sidelink transmission may be a unicast, broadcast, or multicast transmission. The sidelink transmission may include a V2X message. The UE 602 may determine 606 a speed state of the UE 602, such as a high-speed state or a low-speed state. For example, the UE 604 may transmit a pilot signal 605 to the UE 602, which may allow the UE 602 to derive a high-doppler condition based upon a detected frequency shift in the received pilot signal 605. Additionally, or alternatively, the UE 604 may transmit a pilot signal 605 containing a speed and/or a direction of the UE 602, which the UE 602 may use to calculate a relative speed difference between the UE 602 and the UE 604 and determine whether that relative speed difference exceeds a speed threshold value. The UE 602 may be configured to determine 606 a speed state of the UE 602 in any manner described above. If the UE 602 determines 606 that the UE 602 is not in a high-speed state, the UE may select 608 default sidelink transmission reliability configuration settings. For example, the UE 602 may select a PC of PC 3 and a transmission scheme of normal transmissions from a single main transmit antenna without using a transmit diversity scheme. If the UE 602 determines 606 that the UE 602 is in a high-speed state, the UE may select 608 sidelink transmission reliability configuration settings that may increase a reliability of a transmitted sidelink transmission. For example, the UE 602 may select a PC of PC 2 and/or a transmission scheme of TxD or CDD to increase a reliability of a transmitted sidelink transmission. The UE 602 may be configured to not increase a reliability of a transmitted sidelink transmission if a battery level of the UE 602 is at or below a threshold level, or a user of the UE 602 may override such a selection 608 of sidelink transmission reliability configuration settings to increase a reliability of a transmitted sidelink transmission.

The UE 602 may then transmit 610 a sidelink transmission to the UE 604 based upon the selected 608 sidelink transmission reliability configuration settings. For example, if the UE 602 is in a high-speed mode, the UE 602 may transmit 610 a sidelink transmission using CDD using increased transmission power.

Figure 7:
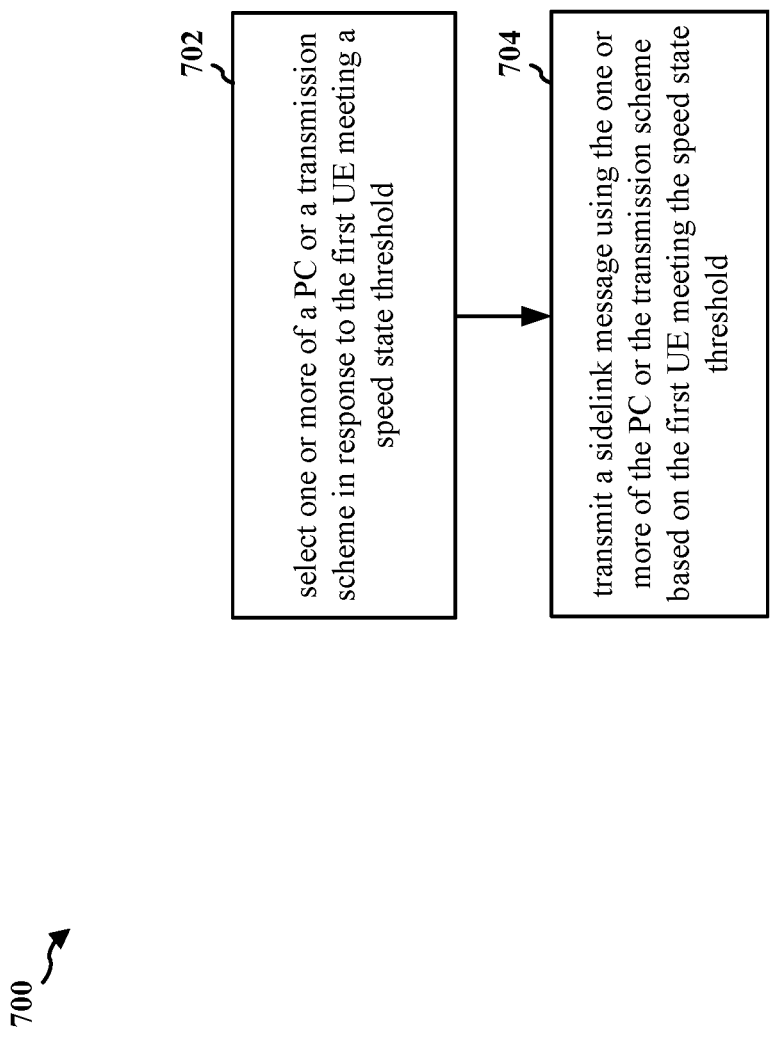
FIG. 7 is a flowchart of a method of wireless communication, in accordance with various aspects of the present disclosure.

FIG. 7 shows a flowchart 700 of a method of wireless communication. The method may be performed by a UE (e.g., the UE 104, wireless communication device 410, wireless communication device 450, UE 502, UE 504, UE 506, UE 508, or UE 602).

At 702, a first UE may select one or more of a PC or a transmission scheme in response to the first UE meeting a speed state threshold. For example, the UE 502 in FIG. 5 may select a PC scheme or a transmission scheme in response to the UE 502 meeting a speed state threshold. Further, 602 may be performed by the sidelink reliability component 198 in FIG. 5 or the sidelink reliability component 840 in FIG. 8.

At 704, the first UE may transmit a sidelink transmission using the one or more of the PC or the transmission scheme based on the first UE meeting the speed state threshold. For example, the UE 502 in FIG. 5 may transmit a sidelink transmission 514 using the one or more of the PC or the transmission scheme based on the UE 502 meeting the speed state threshold. Further, 604 may be performed by the sidelink reliability component 198 in FIG. 5 or the sidelink reliability component 840 in FIG. 8.

In some aspects, to select the one or more of the PC or the transmission scheme is based on a priority level of the sidelink transmission meeting a threshold priority level. For example, the UE 502 in FIG. 5 may select the one or more of the PC or the transmission scheme based on a priority level of the sidelink transmission meeting a threshold priority level.

In some aspects, the priority level may be based on a PPPP level. For example, the UE 502 in FIG. 5 may base a priority level of the sidelink transmission on a PPPP level of the sidelink transmission.

In some aspects, to select the one or more of the PC or the transmission scheme may be based on a battery level for the UE being above a threshold battery level. For example, the UE 502 in FIG. 5 may select sidelink transmission reliability configuration settings to improve reliability of a sidelink transmission if a battery level for the UE 502 meets or is above a threshold battery level, and may not select sidelink transmission reliability configuration settings to improve reliability of a sidelink transmission if a battery level for the UE 502 is below the threshold battery level.

In some aspects, the first UE may be further configured to transmit an additional sidelink transmission using a different PC or a different transmission scheme in response to the battery level of the first UE being below the threshold battery level. For example, the UE 502 in FIG. 5 may select default sidelink transmission reliability configuration settings if a battery level for the UE 502 is below the threshold battery level.

In some aspects, the first UE may select the PC of the first UE by changing the PC of the first UE from a first PC to a second PC, the second PC being associated with an increased transmission power relative to the first PC. For example, the UE 502 in FIG. 5 may change a PC of the UE 502 from PC 3 to PC 2 to increase transmission power of the sidelink transmission.

In some aspects, the changing of the PC of the first UE may include lowering the PC of the first UE from PC 3 to PC 2. For example, the UE 502 in FIG. 5 may change a PC of the UE 502 from PC 3 to PC 2 to increase transmission power of the sidelink transmission.

In some aspects, the transmission scheme of the first UE may include a transmission diversity scheme with transmission of the sidelink transmission via a first antenna and a second antenna. For example, the UE 502 in FIG. 5 may use a TxD scheme with transmission of the sidelink transmission 514 via two antennas.

In some aspects, the first UE may transmit the sidelink transmission via the first antenna and the second antenna by using CDD to simultaneously transmit the sidelink transmission using the first antenna and the second antenna. For example, the UE 502 in FIG. 5 may use a CDD scheme with transmission of the sidelink transmission 514 being broadcast or unicast simultaneously from two antennas.

In some aspects, the first UE may receive an RRC message that indicates the speed state threshold, where the speed state threshold is based on a speed of the first UE. For example, the UE 502 in FIG. 5 may receive an RRC message via a transmission 518 from RSU 507 or an RRC message via a transmission 522 from BS 509 that indicates the speed state threshold. The speed state threshold may determine a speed state of the UE 502, where the UE 502 may be determined to be in a high-speed state at or above the threshold and in a low-speed state below the threshold.

In some aspects, the speed state threshold may be based on a relative speed difference between the first UE and a second UE. For example, the UE 502 in FIG. 5 may calculate a speed difference between the UE 502 and the UE 506, and may compare the speed difference against the speed state threshold.

In some aspects, the relative speed difference between the first UE and the second UE may be based on a doppler estimate response derived by the first UE, where the first UE may derive the doppler estimate response based on a pilot signal transmitted by the second UE to the first UE. For example, the UE 502 in FIG. 5 may receive a pilot signal via a transmission 516 from the UE 506, which the UE 502 may analyze to derive a doppler estimate response. The UE 502 may use the derived doppler estimate response to estimate or derive a relative speed difference between the UE 502 and the UE 506.

In some aspects, the first UE may receive a first control message from the second UE including a reported speed of the second UE, where the relative speed difference between the first UE and the second UE is based on the reported speed of the second UE and a speed of the first UE. For example, the UE 502 in FIG. 5 may receive a control message via a transmission 516 from the UE 506 including a reported speed of the UE 506, where the relative speed difference between the UE 502 and the UE 506 is based on the reported speed of the UE 502 and the reported speed of the UE 506.

In some aspects, the first UE may receive, from the second UE, a second control message indicating a second relative speed difference between the first UE and the second UE and transmit an additional sidelink transmission to the second UE using a different transmission state or a different PC based on the second relative speed difference being below the speed state threshold. For example, the UE 502 in FIG. 5 may receive, from the UE 506, a control message indicating a relative speed difference between the UE 506 and the UE 502 that is calculated by the UE 506. The UE 502 may transmit a sidelink transmission 514 to the UE 506 using a low-speed set of configurations that determines a transmission state and/or a PC level based on the received relative speed difference from the UE 506 being below the speed state threshold.

In some aspects, the first UE may include a transmitter, where the sidelink transmission includes a V2X BSM. For example, the wireless device 410 may include a transmitter 418. The wireless device 410 may also transmit a sidelink transmission including a V2X BSM.

Figure 8:
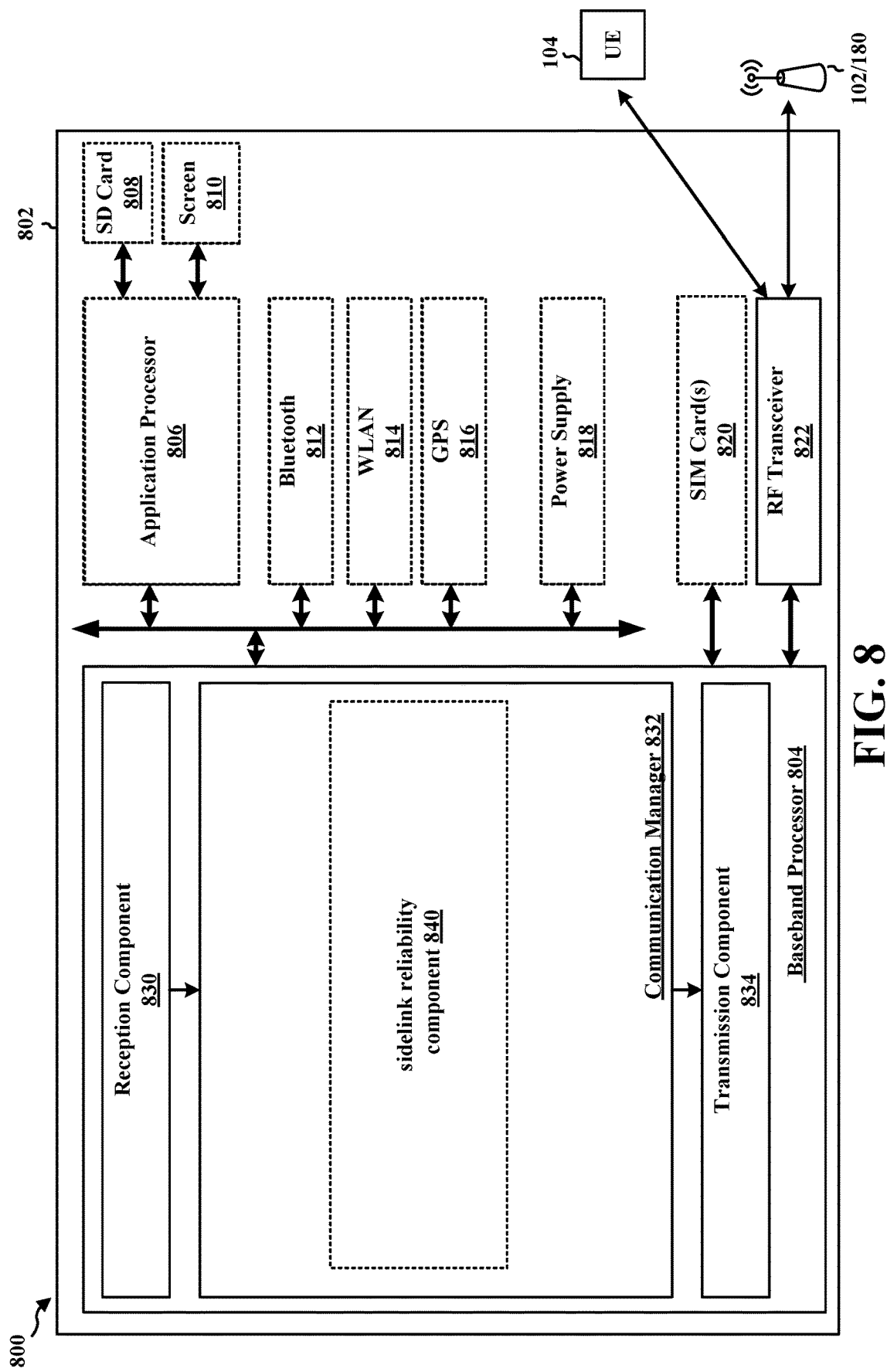
FIG. 8 is a diagram illustrating an example of a hardware implementation for an example apparatus, in accordance with various aspects of the present disclosure.

FIG. 8 is a diagram 800 illustrating an example of a hardware implementation for an apparatus 802. The apparatus 802 may be a UE, or another device configured to transmit and/or receive sidelink communication. The apparatus 802 may include a baseband processor 804 (also referred to as a modem) coupled to a RF transceiver 822. In some aspects, the baseband processor 804 may be a cellular baseband processor and/or the RF transceiver 822 may be a cellular RF transceiver. The apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and/or a power supply 818. The baseband processor 804 communicates through the RF transceiver 822 with the UE 104 and/or BS 102/180. The baseband processor 804 may include a computer-readable medium/memory. The computer-readable medium/memory may be non-transitory. The baseband processor 804 is responsible for general processing, including the execution of software stored on the computer-readable medium/memory. The software, if executed by the baseband processor 804, may cause the baseband processor 804 to perform the various functions described in the present application. The computer-readable medium/memory may also be used for storing data that is manipulated by the baseband processor 804 when executing software. The baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband processor 804. The baseband processor 804 may be a component of the device 450 and may include the memory 460 and/or at least one of the Tx processor 468, the Rx processor 456, and the controller/processor 459. In one configuration, the apparatus 802 may be a modem chip and include just the baseband processor 804, and in another configuration, the apparatus 802 may be the entire UE (e.g., see 450 of FIG. 4) and include the additional modules of the apparatus 802.

The communication manager 832 may include a sidelink reliability component 840 that is configured to adjust sidelink transmission configuration settings based on a speed state of the apparatus 802, e.g., as described in connection with step 702 of FIG. 7.

The apparatus may include additional components that perform each of the blocks of the algorithm in the flowcharts of FIG. 7. As such, each block in the flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband processor 804, includes means for selecting one or more of a power class (PC) or a transmission scheme in response to the first UE meeting a speed state threshold; means for transmitting a sidelink transmission using the one or more of the PC or the transmission scheme based on the first UE meeting the speed state threshold, means for selecting the one or more of the PC or the transmission scheme based on a priority level of the sidelink transmission meeting a threshold priority level; means for selecting the one or more of the PC or the transmission scheme based on a battery level for the UE being above a threshold battery level; transmitting an additional sidelink transmission using a different PC or a different transmission scheme in response to the battery level of the first UE being below the threshold battery level; means for selecting the PC of the first UE by changing the PC of the first UE from a first PC to a second PC, the second PC being associated with an increased transmission power relative to the first PC; means for transmitting the sidelink transmission via the first antenna and the second antenna by using CDD to simultaneously transmit the sidelink transmission using the first antenna and the second antenna; means for receiving an RRC message that indicates the speed state threshold, where the speed state threshold is based on a speed of the first UE; means for receiving a first control message from the second UE including a reported speed of the second UE, where the relative speed difference between the first UE and the second UE is based on the reported speed of the second UE and a speed of the first UE; means for receiving, from the second UE, a second control message indicating a second relative speed difference between the first UE and the second UE; and means for transmitting an additional sidelink transmission to the second UE using a different transmission state or a different PC based on the second relative speed difference being below the speed state threshold. The means may be one or more of the components of the apparatus 802 configured to perform the functions recited by the means. As described herein, the apparatus 802 may include the Tx Processor 368, the Rx Processor 356, and the controller/processor 359. As such, in one configuration, the means may be the Tx Processor 368, the Rx Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is a method of wireless communication at a first wireless device, including selecting one or more of a PC or a transmission scheme in response to the first UE meeting a speed state threshold. The method may also include transmitting a sidelink transmission using the one or more of the PC or the transmission scheme based on the first UE meeting the speed state threshold.

Aspect 2 is the method of aspect 1, further including selecting the one or more of the PC or the transmission scheme based on a priority level of the sidelink transmission meeting a threshold priority level.

Aspect 3 is the method of aspect 2, where the priority level may be based on a PPPP level.

Aspect 4 is the method of any of aspects 1 to 3, further including selecting the one or more of the PC or the transmission scheme based on a battery level for the UE being above a threshold battery level.

Aspect 5 is the method of aspect 4, further including transmitting an additional sidelink transmission using a different PC or a different transmission scheme in response to the battery level of the first UE being below the threshold battery level.

Aspect 6 is the method of any of aspects 1 to 6, further including selecting the PC of the first UE by a change of the PC of the first UE from a first PC to a second PC. The second PC may be associated with an increased transmission power relative to the first PC.

Aspect 7 is the method of aspect 6, where the change of the PC of the first UE may include the change to a lower PC of the first UE from PC 3 to PC 2.

Aspect 8 is the method of any of aspects 1 to 7, where the transmission scheme of the first UE may include a transmission diversity scheme with transmission of the sidelink transmission via a first antenna and a second antenna.

Aspect 9 is the method of aspect 8, further including transmitting the sidelink transmission via the first antenna and the second antenna by using CDD to simultaneously transmit the sidelink transmission using the first antenna and the second antenna.

Aspect 10 is the method of any of aspects 1 to 9, further including receiving an RRC message that indicates the speed state threshold. The speed state threshold may be based on a speed of the first UE.

Aspect 11 is the method of any of aspects 1 to 10, where the speed state threshold may be based on a relative speed difference between the first UE and a second UE.

Aspect 12 is the method of aspect 11, where the relative speed difference between the first UE and the second UE may be based on a doppler estimate response derived by the first UE. The first UE may derive the doppler estimate response based on a pilot signal transmitted by the second UE to the first UE.

Aspect 13 is the method of aspect 11, further including receiving a first control message from the second UE including a reported speed of the second UE. The relative speed difference between the first UE and the second UE may be based on the reported speed of the second UE and a speed of the first UE.

Aspect 14 is the method of aspect 13, further including receiving, from the second UE, a second control message indicating a second relative speed difference between the first UE and the second UE. The method may further include transmitting an additional sidelink transmission to the second UE using a different transmission state or a different PC based on the second relative speed difference being below the speed state threshold.

Aspect 15 is the method of any of aspects 1 to 14, where the sidelink transmission may include a V2X BSM.

Aspect 16 is an apparatus for wireless communication at a first UE including a memory and at least one processor coupled to the memory. The memory and the at least one processor may be configured to select one or more of a PC or a transmission scheme in response to the first UE meeting a speed state threshold. The memory and the at least one processor may be further configured to transmit a sidelink transmission using the one or more of the PC or the transmission scheme based on the first UE meeting the speed state threshold.

Aspect 17 is the apparatus of aspect 16, where the memory and the at least one processor may be further configured to select the one or more of the PC or the transmission scheme based on a priority level of the sidelink transmission meeting a threshold priority level.

Aspect 18 is the apparatus of aspect 17, where the priority level may be based on a PPPP level.

Aspect 19 is the apparatus of any of aspects 16 to 18, where the memory and the at least one processor may be configured to select the one or more of the PC or the transmission scheme based on a battery level for the UE being above a threshold battery level.

Aspect 20 is the apparatus of aspect 19, where the memory and the at least one processor may be further configured to transmit an additional sidelink transmission using a different PC or a different transmission scheme in response to the battery level of the first UE being below the threshold battery level.

Aspect 21 is the apparatus of any of aspects 16 to 20, where the memory and the at least one processor may be configured to select the PC of the first UE by a change of the PC of the first UE from a first PC to a second PC, the second PC being associated with an increased transmission power relative to the first PC.

Aspect 22 is the apparatus of aspect 21, where the change of the PC of the first UE may include lowering the PC of the first UE from PC 3 to PC 2.

Aspect 23 is the apparatus of any of aspects 16 to 22, where the transmission scheme of the first UE may include a transmission diversity scheme with transmission of the sidelink transmission via a first antenna and a second antenna.

Aspect 24 is the apparatus of aspect 23, where the memory and the at least one processor may be configured to transmit the sidelink transmission via the first antenna and the second antenna by using CDD to simultaneously transmit the sidelink transmission using the first antenna and the second antenna.

Aspect 25 is the apparatus of any of aspects 16 to 24, where the memory and the at least one processor may be further configured to receive an RRC message that indicates the speed state threshold, where the speed state threshold is based on a speed of the first UE.

Aspect 26 is the apparatus of any of aspects 16 to 25, where the speed state threshold may be based on a relative speed difference between the first UE and a second UE.

Aspect 27 is the apparatus of aspect 26, where the relative speed difference between the first UE and the second UE may be based on a doppler estimate response derived by the first UE, where the first UE derives the doppler estimate response based on a pilot signal transmitted by the second UE to the first UE.

Aspect 28 is the apparatus of aspect 26, where the memory and the at least one processor may be further configured to receive a first control message from the second UE including a reported speed of the second UE, and where the relative speed difference between the first UE and the second UE may be based on the reported speed of the second UE and a speed of the first UE.

Aspect 29 is the apparatus of aspect 28, where the memory and the at least one processor may be further configured to: receive, from the second UE, a second control message indicating a second relative speed difference between the first UE and the second UE; and transmit an additional sidelink transmission to the second UE using a different transmission state or a different PC based on the second relative speed difference being below the speed state threshold.

Aspect 30 is the apparatus of any of aspects 16 to 29, further including a transceiver coupled to the at least one processor, where the sidelink transmission may include a V2X BSM.

Aspect 31 is the apparatus of any of aspects 16 to 30 further including at least one antenna coupled to the at least one processor.

Aspect 32 is an apparatus for wireless communication including means for implementing any of aspects 1 to 31.

Aspect 33 is a non-transitory computer-readable medium storing computer executable code, where the code, when executed by a processor, causes the processor to implement any of aspects 1 to 31.

What is claimed is:

1. An apparatus for wireless communication at a first user equipment (UE), comprising:
   memory; and
   one or more processors coupled to the memory, wherein the one or more processors are configured to cause the first UE to:
   select at least one of a first power class (PC) or a first transmission scheme based on a speed state of the first UE that meets a speed state threshold;
   transmit a first sidelink transmission that uses at least one of the first PC or the first transmission scheme based on a first determination that the speed state of the first UE meets the speed state threshold; and
   transmit a second sidelink transmission that uses at least one of a second PC or a second transmission scheme based on a second determination that the speed state of the first UE does not meet the speed state threshold, wherein the second PC is lower than the first PC, and wherein the second transmission scheme has a lower complexity than the first transmission scheme.

2. The apparatus of claim 1, wherein, to select at least one of the first PC or the first transmission scheme, the one or more processors are configured to cause the first UE to:
   select at least one of the first PC or the first transmission scheme further based on a priority level of the first sidelink transmission that meets a threshold priority level.

3. The apparatus of claim 2, wherein the priority level is based on a ProSe per-packet priority (PPPP) level.

4. The apparatus of claim 1, wherein, to select the at least one of the first PC or the first transmission scheme, the one or more processors are further configured to cause the first UE to:
   select the at least one of the first PC or the first transmission scheme based on a battery level for the first UE that is above a threshold battery level.

5. The apparatus of claim 4, wherein, to transmit the second sidelink transmission that uses at least one of the second PC or the second transmission scheme, the one or more processors are further configured to cause the first UE to:
   transmit the second sidelink transmission that uses at least one of the second PC or the second transmission scheme based on the battery level of the first UE that is below the threshold battery level.

6. The apparatus of claim 1, wherein, to select at least one of the first PC or the first transmission scheme, the one or more processors are configured to cause the first UE to:
   change a PC configuration setting of the first UE from the first PC to the second PC, wherein the second PC is associated with an increased transmission power relative to the first PC.

7. The apparatus of claim 6, wherein, to change from the first PC to the second PC, the one or more processors are configured to cause the first UE to:
lower the PC configuration setting of the first UE from PC 3 to PC 2.

8. The apparatus of claim 1, wherein the first transmission scheme of the first UE comprises a transmission diversity scheme, wherein, to transmit the first sidelink transmission that uses at least one of the first PC or the first transmission scheme, the one or more processors are configured to cause the first UE to:
transmit the first sidelink transmission via a first antenna and a second antenna.

9. The apparatus of claim 8, wherein, to transmit the first sidelink transmission via the first antenna and the second antenna, the one or more processors are configured to cause the first UE to:
use cyclic delay diversity (CDD) to simultaneously transmit the first sidelink transmission via the first antenna and the second antenna.

10. The apparatus of claim 1, wherein the one or more processors are further configured to cause the first UE to:
receive a radio resource control (RRC) message that indicates the speed state threshold before the transmission of the first sidelink transmission, wherein the speed state is based on a comparison of a speed of the first UE and the indicated speed state threshold.

11. The apparatus of claim 1, wherein the speed state threshold is based on a relative speed difference between the first UE and a second UE.

12. The apparatus of claim 11, wherein the one or more processors are further configured to cause the first UE to:
derive a doppler estimate response based on a pilot signal received from the second UE, wherein the relative speed difference between the first UE and the second UE is based on the derived doppler estimate response.

13. The apparatus of claim 11, wherein the one or more processors are further configured to cause the first UE to:
receive a first control message from the second UE, wherein the first control message includes a reported speed of the second UE, and wherein the relative speed difference between the first UE and the second UE is based on the reported speed of the second UE and a speed of the first UE.

14. The apparatus of claim 13, wherein the one or more processors are further configured to cause the first UE to:
receive, from the second UE, a second control message that indicates a second relative speed difference between the first UE and the second UE; and
transmit an additional sidelink transmission to the second UE that uses a different transmission state or a different PC based on the second relative speed difference.

15. The apparatus of claim 1, wherein the first sidelink transmission comprises a vehicle to everything (V2X) basic safety message (BSM).

16. The apparatus of claim 1, further comprising at least a transceiver or an antenna coupled to the one or more processors, wherein, to transmit the first sidelink transmission, the one or more processors are further configured to cause the first UE to:
transmit the first sidelink transmission via at least one of the transceiver or the antenna.

17. A method of wireless communication at a first user equipment (UE), comprising:
selecting at least one of a first power class (PC) or a first transmission scheme based on a speed state of the first UE that meets a speed state threshold;
transmitting a first sidelink transmission using at least one of the first PC or the first transmission scheme based on a first determination that the speed state of the first UE meets the speed state threshold; and
transmitting a second sidelink transmission using at least one of a second PC or a second transmission scheme based on a second determination that the speed state of the first UE does not meet the speed state threshold, wherein the second PC is lower than the first PC, and wherein the second transmission scheme has a lower complexity than the first transmission scheme.

18. The method of claim 17, wherein selecting at least one of the first PC or the first transmission scheme comprises:
selecting at least one of the first PC or the first transmission scheme further based on a priority level of the first sidelink transmission, wherein the priority level is based on a ProSe per-packet priority (PPPP) level.

19. The method of claim 17, wherein selecting at least one of the first PC or the first transmission scheme further comprises:
selecting the at least one of the first PC or the first transmission scheme based on a battery level for the first UE that is above a threshold battery level.

20. The method of claim 19, wherein transmitting the second sidelink transmission using at least one of the second PC or the second transmission scheme further comprises:
transmitting the second sidelink transmission using at least one of the second PC or the second transmission scheme based on the battery level of the first UE being below the threshold battery level.

21. The method of claim 17, wherein selecting the first PC comprises:
changing a PC configuration setting of the first UE from the first PC to the second PC, the second PC being associated with an increased transmission power relative to the first PC.

22. The method of claim 21, wherein changing from the first PC to the second PC comprises:
lowering the PC configuration setting of the first UE from PC 3 to PC 2.

23. The method of claim 17, wherein the first transmission scheme of the first UE comprises a transmission diversity scheme, wherein transmitting the first sidelink transmission using at least one of the first PC or the first transmission scheme comprises:
transmitting the first sidelink transmission via a first antenna and a second antenna.

24. The method of claim 23, wherein transmitting the first sidelink transmission via the first antenna and the second antenna comprises:
using cyclic delay diversity (CDD) to simultaneously transmit the first sidelink transmission via the first antenna and the second antenna.

25. The method of claim 17, wherein the speed state of the first UE is based on a speed of the first UE, the method further comprising:
receiving a radio resource control (RRC) message that indicates the speed state threshold before the transmission of the first sidelink transmission, wherein the speed state is based on a comparison of the speed of the first UE and the indicated speed state threshold.

26. The method of claim 17, wherein the speed state threshold is based on a relative speed difference between the first UE and a second UE.

27. The method of claim 26, further comprising:
deriving a doppler estimate response based on a pilot signal received by the first UE from the second UE, and deriving the relative speed difference between the first UE and the second UE based on the doppler estimate response.

28. The method of claim 26, further comprising:
receiving a first control message from the second UE including a reported speed of the second UE, wherein the relative speed difference between the first UE and the second UE is based on the reported speed of the second UE and a speed of the first UE.

29. An apparatus for wireless communication at a first user equipment (UE), comprising:
  means for selecting at least one of a first power class (PC) or a first transmission scheme based on a speed state of the first UE that meets a speed state threshold;
  means for transmitting a first sidelink transmission using at least one of the first PC or the first transmission scheme based on a first determination that the speed state of the first UE meets the speed state threshold; and
  means for transmitting a second sidelink transmission using at least one of a second PC or a second transmission scheme based on a second determination that the speed state of the first UE does not meet the speed state threshold, wherein the second PC is lower than the first PC, and wherein the second transmission scheme has a lower complexity than the first transmission scheme.

30. At least one non-transitory computer-readable medium storing computer executable code for wireless communication at a first user equipment (UE), the code when executed by one or more processors cause the one or more processors to:
  select at least one of a first power class (PC) or a first transmission scheme based on a speed state of the first UE that meets a speed state threshold;
  transmit a first sidelink transmission using at least one of the first PC or the first transmission scheme based on a first determination that the speed state of the first UE meets the speed state threshold; and
  transmit a second sidelink transmission using at least one of a second PC or a second transmission scheme based on a second determination that the speed state of the first UE does not meet the speed state threshold, wherein the second PC is lower than the first PC, and wherein the second transmission scheme has a lower complexity than the first transmission scheme.

* * * * *